US009113240B2

(12) United States Patent
Ramakrishnan et al.

(10) Patent No.: US 9,113,240 B2
(45) Date of Patent: Aug. 18, 2015

(54) SPEECH ENHANCEMENT USING MULTIPLE MICROPHONES ON MULTIPLE DEVICES

(75) Inventors: Dinesh Ramakrishnan, San Diego, CA (US); Song Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 12/405,057

(22) Filed: Mar. 16, 2009

(65) Prior Publication Data

US 2009/0238377 A1 Sep. 24, 2009

Related U.S. Application Data

(60) Provisional application No. 61/037,461, filed on Mar. 18, 2008.

(51) Int. Cl.
*H04B 15/00* (2006.01)
*H04R 3/00* (2006.01)
(Continued)

(52) U.S. Cl.
CPC .............. *H04R 3/005* (2013.01); *G10L 21/028* (2013.01); *G10L 21/0308* (2013.01); *G10L 2021/02165* (2013.01); *G10L 2021/02166* (2013.01); *H04R 29/006* (2013.01); *H04R 2420/07* (2013.01); *H04R 2430/03* (2013.01); *H04R 2430/20* (2013.01); *H04R 2499/11* (2013.01)

(58) Field of Classification Search
CPC ................... G10L 2021/02165; G10L 21/028; G10L 2021/02166; G10L 21/0308; H04R 2430/03; H04R 2430/20; H04R 29/006
USPC ......... 381/26, 92, 314, 315, 914, 94.7, 94.72, 381/94.3, 94.1, 71.7, 71.6; 379/406.02, 379/406.06, 406.08, 406.09; 455/570, 455/575.2, 41.2, 501
See application file for complete search history.

(56) References Cited

U.S. PATENT DOCUMENTS 7,206,255 B2 * 4/2007 Ukita .............................. 367/38
7,283,788 B1 10/2007 Posa et al.
(Continued)

FOREIGN PATENT DOCUMENTS

CN 1809105 A 7/2006
CN 101031956 A 9/2007
(Continued)

OTHER PUBLICATIONS

B. D. Van Veen, "Beamforming: A versatile approach to spatial filtering," IEEE Acoustics, Speech and Signal Processing Magazine, pp. 4-24, Apr. 1988.
(Continued)

*Primary Examiner* — Eva Y Montalvo
*Assistant Examiner* — Diana C Vieira
(74) *Attorney, Agent, or Firm* — Espartaco Diaz Hidalgo

(57) ABSTRACT

Signal processing solutions take advantage of microphones located on different devices and improve the quality of transmitted voice signals in a communication system. With usage of various devices such as Bluetooth headsets, wired headsets and the like in conjunction with mobile handsets, multiple microphones located on different devices are exploited for improving performance and/or voice quality in a communication system. Audio signals are recorded by microphones on different devices and processed to produce various benefits, such as improved voice quality, background noise reduction, voice activity detection and the like.

31 Claims, 12 Drawing Sheets

(51) Int. Cl.

| | |
|---|---|
| ***G10L 21/028*** | (2013.01) |
| *G10L 21/0216* | (2013.01) |
| *G10L 21/0308* | (2013.01) |
| *H04R 29/00* | (2006.01) |

(56) References Cited

U.S. PATENT DOCUMENTS

| | | | | |
|---|---|---|---|---|
| 7,706,821 | B2 * | 4/2010 | Konchitsky | 455/501 |
| 7,983,428 | B2 * | 7/2011 | Ma et al. | 381/94.7 |
| 2002/0193130 | A1 | 12/2002 | Yang et al. | |
| 2003/0014248 | A1 | 1/2003 | Vetter | |
| 2004/0203470 | A1 | 10/2004 | Berliner et al. | |
| 2006/0252470 | A1 | 11/2006 | Seshadri et al. | |
| 2007/0038457 | A1 | 2/2007 | Hwang et al. | |
| 2007/0041312 | A1 | 2/2007 | Kim | |
| 2007/0242839 | A1 | 10/2007 | Kim et al. | |
| 2007/0257840 | A1 | 11/2007 | Wang et al. | |
| 2008/0201138 | A1 * | 8/2008 | Visser et al. | 704/227 |
| 2009/0089053 | A1 | 4/2009 | Wang et al. | |
| 2009/0089054 | A1 | 4/2009 | Wang et al. | |
| 2009/0190769 | A1 | 7/2009 | Wang et al. | |
| 2009/0190774 | A1 | 7/2009 | Wang et al. | |

FOREIGN PATENT DOCUMENTS

| | | | |
|---|---|---|---|
| JP | 9238394 | A | 9/1997 |
| JP | 2002062348 | A | 2/2002 |
| JP | 2003032779 | A | 1/2003 |
| JP | 2007060664 | A | 3/2007 |
| JP | 2007325201 | A | 12/2007 |
| JP | 2008507926 | A | 3/2008 |
| KR | 20070073735 | A | 7/2007 |
| RU | 2047946 | C1 | 11/1995 |
| RU | 59917 | U1 | 12/2006 |
| WO | WO2006028587 | | 3/2006 |

OTHER PUBLICATIONS

Cardoso, J.F.: "Blind Signal Separation: Statistical Principles," ENST/CNRS 75634 Paris Cedex 13, France, Proceedings of the IEEE, vol. 86, No. 10, Oct. 1998.

Cardoso, J.F.: "Source Separation Using Higher Order Moments," Ecole Nat. Sup. Des Telecommunications-Dept Signal 46 rue Barrault, 75634 Paris Cedex 13, France and CNRS-URS 820, GRECO-TDSI, ICASSP, IEEE International Conference on Acoustics, Speech and Signal Processing—Proceedings 4, pp. 2109-2112, 1989.

Comon, P.: "Independent Component Analysis, A New Concept?," Thomson-Sintra, Valbonne Cedex, France, Signal Processing 36 (1994) 287-314, (Aug. 24, 1992).

D.G. Brennan, "Linear Diversity Combining Techniques," Proceedings of the IRE, vol. 47, Jun. 1959, pp. 1075-1102.

Griffiths, L. et al. "An Alternative Approach to Linearly Constrained Adaptive Beamforming." IEEE Transactions on Antennas and Propagation, vol. AP-30(1):27-34. Jan. 1982.

Norman C. Beaulieu, "Introduction to Linear Diversity Combining Techniques," Proceedings of the IEEE, vol. 91, No. 2, Feb. 2003.

O. L. Frost, "An algorithm for linearly constrained adaptive array processing," Proc. IEEE, vol. 60, No. 8, pp. 926-935, Aug. 1972.

Wolfel, M., McDonough, J.: "Combining Multi-Source Far Distance Speech Recognition Strategies: Beamforming, Blind Channel and Confusion Network Combination" Interspeech 2005 Conference Proceedings, [Online] Sep. 4-8, 2005, pp. 3149-3152, XP002534485 Lisboa, Portugal.

Written Opinion—PCT/US2009/037481, International Search Authority, European Patent Office, Jul. 13, 2009.

International Search Report—PCT/US2009/037481—International Search Authority, European Patent Office, Jul. 13, 2009.

Taiwan Search Report—TW098108784—TIPO—Sep. 20, 2012.

Taiwan Search Report—TW098108784—TIPO—Jun. 27, 2013.

* cited by examiner

SPEECH ENHANCEMENT USING MULTIPLE MICROPHONES ON MULTIPLE DEVICES

CLAIM OF PRIORITY UNDER 35 U.S.C. §119

The present Application for patent claims priority to Provisional Application No. 61/037,461 entitled “Speech Enhancement Using Multiple Microphones on Multiple Devices” filed Mar. 18, 2008, and assigned to the assignee herein.

BACKGROUND

1. Field

The present disclosure pertains generally to the field of signal processing solutions used to improve voice quality in communication systems, and more specifically, to techniques of exploiting multiple microphones to improve the quality of voice communications.

2. Background

In mobile communication systems, the quality of transmitted voice is an important factor in the overall quality of service experienced by users. In recent times, some mobile communication devices (MCDs) have included multiple microphones in the MCD to improve the quality of the transmitted voice. In these MCDs, advanced signal processing techniques that exploit audio information from multiple microphones are used to enhance the voice quality and suppress background noise. However, these solutions generally require that the multiple microphones are all located on the same MCD. Known examples of multi-microphone MCDs include cellular phone handsets with two or more microphones and Bluetooth wireless headsets with two microphones.

The voice signals captured by microphones on MCDs are highly susceptible to environmental effects such as background noise, reverberation and the like. MCDs equipped with only a single microphone suffer from poor voice quality when used in noisy environments, i.e., in environments where the signal-to-noise ratio (SNR) of an input voice signal is low. To improve operability in noisy environments, multi-microphone MCDs were introduced. Multi-microphone MCDs process audio captured by an array of microphones to improve voice quality even in hostile (highly noisy) environments. Known multiple microphone solutions can employ certain digital signal processing techniques to improve voice quality by exploiting audio captured by the different microphones located on an MCD.

SUMMARY

Known multi-microphone MCDs require all microphones to be located on the MCD. Because the microphones are all located on the same device, known multi-microphone audio processing techniques and their effectiveness are governed by the relatively limited space separation between the microphones within the MCD. It is thus desirable to find a way to increase effectiveness and robustness of multi-microphone techniques used in mobile devices.

In view of this, the present disclosure is directed to a mechanism that exploits signals recorded by multiple microphones to improve the voice quality of a mobile communication system, where some of the microphones are located on different devices, other than the MCD. For example, one device may be the MCD and the other device may be a wireless/wired device that communicates to the MCD. Audio captured by microphones on different devices can be processed in various ways. In this disclosure, several examples are provided: multiple microphones on different devices may be exploited to improve voice activity detection (VAD); multiple microphones may also be exploited for performing speech enhancement using source separation methods such as beamforming, blind source separation, spatial diversity reception schemes and the like.

According to one aspect, a method of processing audio signals in a communication system includes capturing a first audio signal with a first microphone located on a wireless mobile device; capturing a second audio signal with a second microphone located on a second device not included in the wireless mobile device; and processing the first and second captured audio signals to produce a signal representing sound from one of the sound sources, for example, the desired source, but separated from sound coming from others of the sound sources, for example, ambient noise sources, interfering sound sources or the like. The first and second audio signals may represent sound from the same sources in a local environment.

According to another aspect, an apparatus includes a first microphone, located on a wireless mobile device, configured to capture a first audio signal; a second microphone, located on a second device not included in the wireless mobile device, configured to capture a second audio signal; and a processor configured to produce a signal representing sound from one of the sound sources separated from sound from others of the sources, in response to the first and second captured audio signals.

According to another aspect, an apparatus includes means for capturing a first audio signal at wireless mobile device; means for capturing a second audio signal at a second device not included in the wireless mobile device; and means for processing the first and second captured audio signals to produce a signal representing sound from one of the sound sources separated from sound from others of the sound sources.

According to a further aspect, a computer-readable medium, embodying a set of instructions executable by one or more processors, includes code for capturing a first audio signal at wireless mobile device; code for capturing a second audio signal at a second device not included in the wireless mobile device; and code for processing the first and second captured audio signals to produce a signal representing sound from one of the sound sources separated from sound from others of the sound sources.

Other aspects, features, methods and advantages will be or will become apparent to one with skill in the art upon examination of the following figures and detailed description. It is intended that all such additional features, aspects, methods and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the techniques and devices described herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Figure 1:
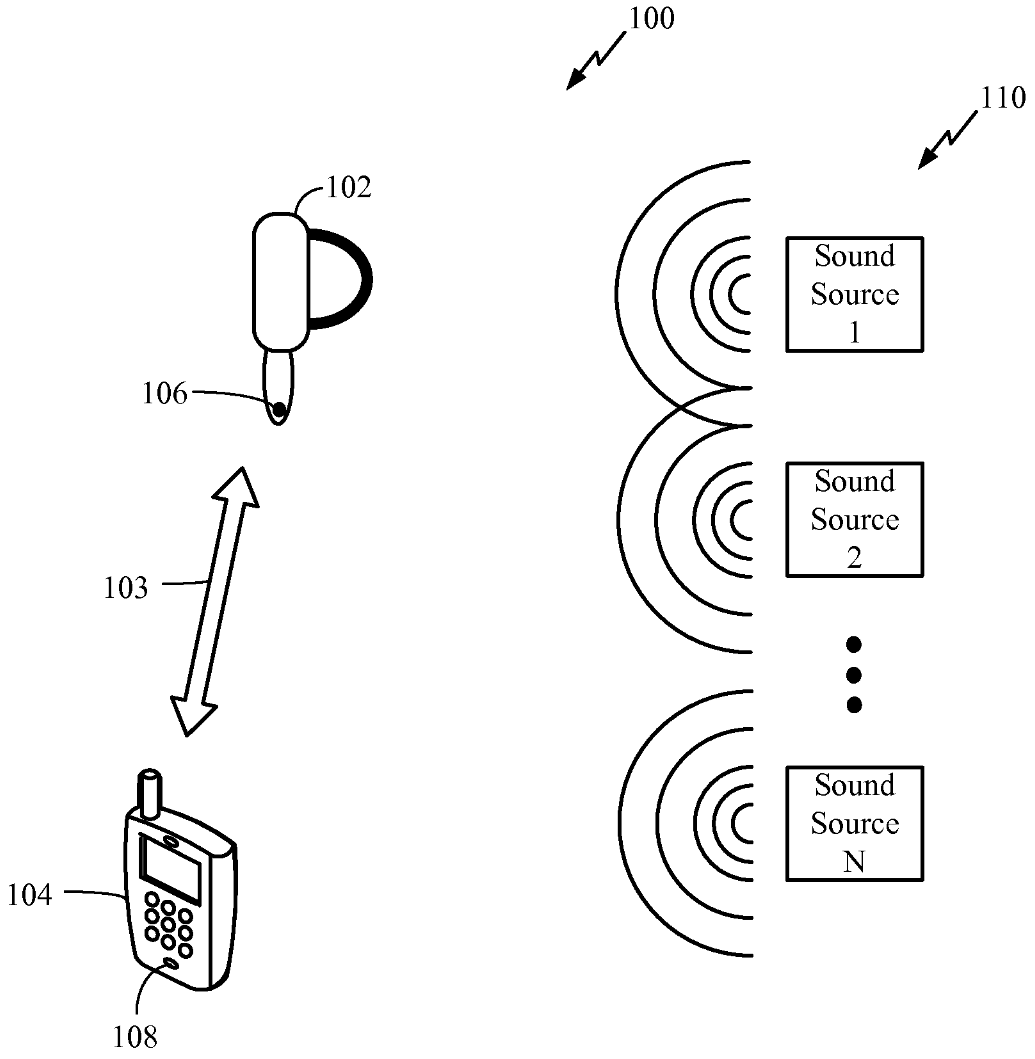
FIG. 1 is a diagram of an exemplary communication system including a mobile communication device and headset having multiple microphones.

FIG. 1 is a diagram of an exemplary communication system 100 including a mobile communication device (MCD) 104 and headset 102 having multiple microphones 106, 108. In the example shown, the headset 102 and MCD 104 communicate via a wireless link 103, such as a Bluetooth connection. Although a bluetooth connection may be used to communicate between an MCD 104 and a headset 102, it is anticipated that other protocols may be used over the wireless link 103. Using a Bluetooth wireless link, audio signals between the MCD 104 and headset 102 may be exchanged according to the Headset Profile provided by Bluetooth Specification, which is available at www.bluetooth.com.

A plurality of sound sources 110 emit sounds that are picked up by the microphones 106, 108 on the different devices 102, 104.

Multiple microphones located on different mobile communication devices can be exploited for improving the quality of transmitted voice. Disclosed herein are methods and apparatuses by which microphone audio signals from multiple devices can be exploited to improve the performance. However, the present disclosure is not limited to any particular method of multi-microphone processing or to any particular set of mobile communication devices.

Audio signals that are captured by multiple microphones located near each other typically capture a mixture of sound sources. The sound sources may be noise like (street noise, babble noise, ambient noise, or the like) or may be a voice or an instrument. Sound waves from a sound source may bounce or reflect off of walls or nearby objects to produce different sounds. It is understood by a person having ordinary skill in the art that the term sound source may also be used to indicate different sounds other than the original sound source, as well as the indication of the original sound source. Depending on the application, a sound source may be voice like or noise like.

Currently, there are many devices—mobile handsets, wired headsets, Bluetooth headsets and the like—with just single microphones. But these devices offer multiple microphone features when two or more of these devices are used in conjunction. In these circumstances, the methods and apparatus described herein are able to exploit the multiple microphones on different devices and improve the voice quality.

It is desirable to separate the mixture of received sound into at least two signals representing each of the original sound sources by applying an algorithm that uses the plurality of captured audio signals. That is to say, after applying a source separation algorithm such as blind source separation (BSS), beamforming, or spatial diversity, the "mixed" sound sources may be heard separately. Such separation techniques include BSS, beamforming and spatial diversity processing.

Described herein are several exemplary methods for exploiting multiple microphones on different devices to improve the voice quality of the mobile communication system. For simplicity, in this disclosure, one example is presented involving only two microphones: one microphone on the MCD 104 and one microphone on an accessory, such as the headset 102 or a wired headset. However, the techniques disclosed herein may be extended to systems involving more than two microphones, and MCDs and headsets that each have more than one microphone.

In the system 100, the primary microphone 106 for capturing the speech signal is located on the headset 102 because it is usually closest to the speaking user, whereas the microphone 108 on the MCD 104 is the secondary microphone 108. Furthermore, the disclosed methods can be used with other suitable MCD accessories, such as wired headsets.

The two microphone signal processing is performed in the MCD 104. Since the primary microphone signal received from the headset 102 is delayed due to wireless communication protocols when compared to the secondary microphone signal from the secondary microphone 108, a delay compensation block is required before the two microphone signals can be processed. The delay value required for delay compensation block is typically known for a given Bluetooth headset. If the delay value is unknown, a nominal value is used for the delay compensation block and inaccuracy of delay compensation is taken care of in the two microphone signal processing block.

Figure 2:
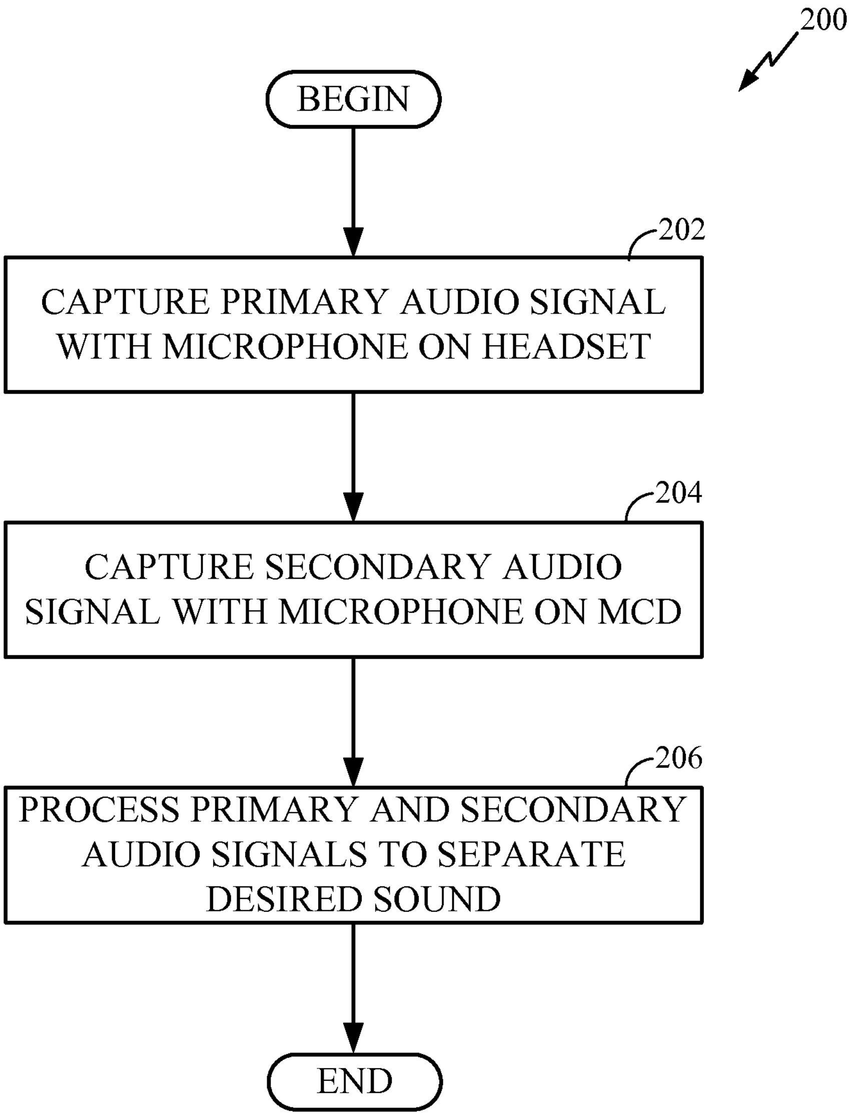
FIG. 2 is a flowchart illustrating a method of processing audio signals from multiple microphones.

FIG. 2 is a flowchart illustrating a method 200 of processing audio signals from multiple microphones. In step 202, a primary audio signal is captured by the primary microphone 106 located on headset 102.

In step 204, secondary audio signal is captured with the secondary microphone 108 located on the MCD 104. The primary and secondary audio signals represent sound from the sound sources 110 received at the primary and secondary microphones 106, 108, respectively.

In step 206, the primary and secondary captured audio signals are processed to produce a signal representing sound from one of the sound sources 110, separated from sound from others of the sound sources 110.

Figure 3:
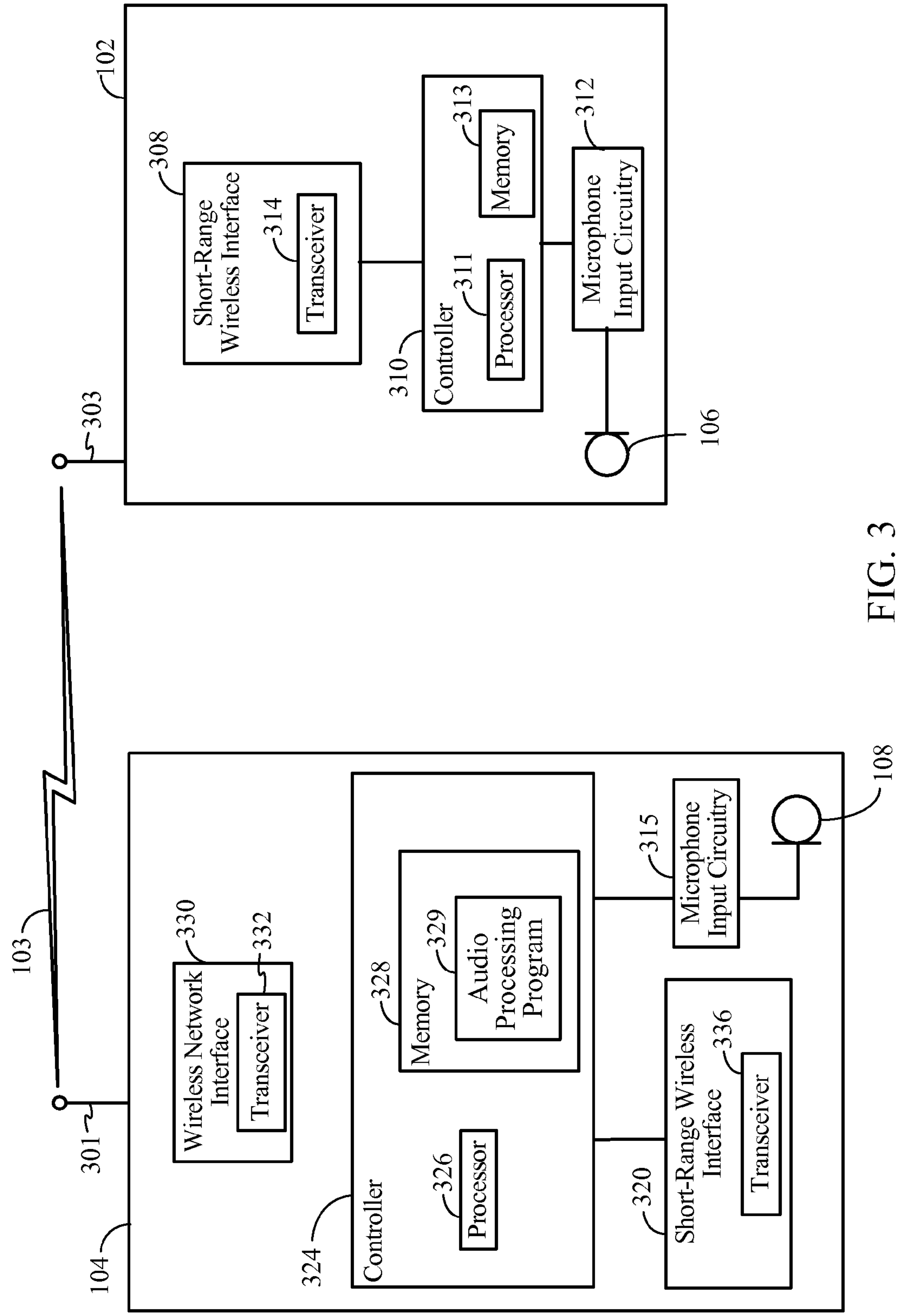
FIG. 3 is a block diagram showing certain components of the mobile communication device and headset of FIG. 1.

FIG. 3 is a block diagram showing certain components of the MCD 104 and headset 102 of FIG. 1. The wireless headset 102 and a MCD 104 are each capable of communicating with one another over the wireless link 103.

The headset 102 includes a short-range wireless interface 308 coupled to an antenna 303 for communicating with the MCD 106 over the wireless link 103. The wireless headset 102 also includes a controller 310, the primary microphone 106, and microphone input circuitry 312.

The controller 310 controls the overall operation of the headset 102 and certain components contained therein, and it includes a processor 311 and memory 313. The processor 311 can be any suitable processing device for executing programming instructions stored in the memory 313 to cause the headset 102 to perform its functions and processes as described herein. For example, the processor 311 can be a microprocessor, such as an ARM7, digital signal processor (DSP), one or more application specific integrated circuits (ASICs), field programmable gate arrays (FPGAs), complex programmable logic devices (CPLDs), discrete logic, software, hardware, firmware or any suitable combination thereof.

The memory 313 is any suitable memory device for storing programming instructions and data executed and used by the processor 311.

The short-range wireless interface 308 includes a transceiver 314 and provides two-way wireless communications with the MCD 104 through the antenna 303. Although any suitable wireless technology can be employed with the headset 102, the short-range wireless interface 308 preferably includes a commercially-available Bluetooth module that provides at least a Bluetooth core system consisting of the antenna 303, a Bluetooth RF transceiver, baseband processor, protocol stack, as well as hardware and software interfaces for connecting the module to the controller 310, and other components, if required, of the headset 102.

The microphone input circuitry 312 processes electronic signals received from the primary microphone 106. The microphone input circuitry 312 includes an analog-to-digital converter (ADC) (not shown) and may include other circuitry for processing the output signals from the primary microphone 106. The ADC converts analog signals from the microphone into digital signal that are then processed by the controller 310. The microphone input circuitry 312 may be implemented using commercially-available hardware, software, firmware, or any suitable combination thereof. Also, some of the functions of the microphone input circuitry 312 may be implemented as software executable on the processor 311 or a separate processor, such as a digital signal processor (DSP).

The primary microphone 108 may be any suitable audio transducer for converting sound energy into electronic signals.

The MCD 104 includes a wireless wide-area network (WWAN) interface 330, one or more antennas 301, a short-range wireless interface 320, the secondary microphone 108, microphone input circuitry 315, and a controller 324 having a processor 326 and a memory 328 storing one or more audio processing programs 329. The audio programs 329 can configure the MCD 104 to execute, among other things, the process blocks of FIGS. 2 and 4-12 described herein. The MCD 104 can include separate antennas for communicating over the short-range wireless link 103 and a WWAN link, or alternatively, a single antenna may be used for both links.

The controller 324 controls the overall operation of the MCD 104 and certain components contained therein. The processor 326 can be any suitable processing device for executing programming instructions stored in the memory 328 to cause the MCD 104 to perform its functions and processes as described herein. For example, the processor 326 can be a microprocessor, such as an ARM7, digital signal processor (DSP), one or more application specific integrated circuits (ASICs), field programmable gate arrays (FPGAs), complex programmable logic devices (CPLDs), discrete logic, software, hardware, firmware or any suitable combination thereof.

The memory 324 is any suitable memory device for storing programming instructions and data executed and used by the processor 326.

The WWAN interface 330 comprises the entire physical interface necessary to communicate with a WWAN. The interface 330 includes a wireless transceiver 332 configured to exchange wireless signals with one or more base stations within a WWAN. Examples of suitable wireless communications networks include, but are not limited to, code-division multiple access (CDMA) based networks, WCDMA, GSM, UTMS, AMPS, PHS networks or the like. The WWAN interface 330 exchanges wireless signals with the WWAN to facilitate voice calls and data transfers over the WWAN to a connected device. The connected device may be another WWAN terminal, a landline telephone, or network service entity such as a voice mail server, Internet server or the like.

The short-range wireless interface 320 includes a transceiver 336 and provides two-way wireless communications with the wireless headset 102. Although any suitable wireless technology can be employed with the MCD 104, the short-range wireless interface 336 preferably includes a commercially-available Bluetooth module that provides at least a Bluetooth core system consisting of the antenna 301, a Bluetooth RF transceiver, baseband processor, protocol stack, as well as hardware and software interfaces for connecting the module to the controller 324 and other components, if required, of the MCD 104.

The microphone input circuitry 315 processes electronic signals received from the secondary microphone 108. The microphone input circuitry 315 includes an analog-to-digital converter (ADC) (not shown) and may include other circuitry for processing the output signals from the secondary microphone 108. The ADC converts analog signals from the microphone into digital signal that are then processed by the controller 324. The microphone input circuitry 315 may be implemented using commercially-available hardware, software, firmware, or any suitable combination thereof. Also, some of the functions of the microphone input circuitry 315 may be implemented as software executable on the processor 326 or a separate processor, such as a digital signal processor (DSP).

The secondary microphone 108 may be any suitable audio transducer for converting sound energy into electronic signals.

The components of the MCD 104 and headset 102 may be implemented using any suitable combination of analog and/or digital hardware, firmware or software.

Figure 4:
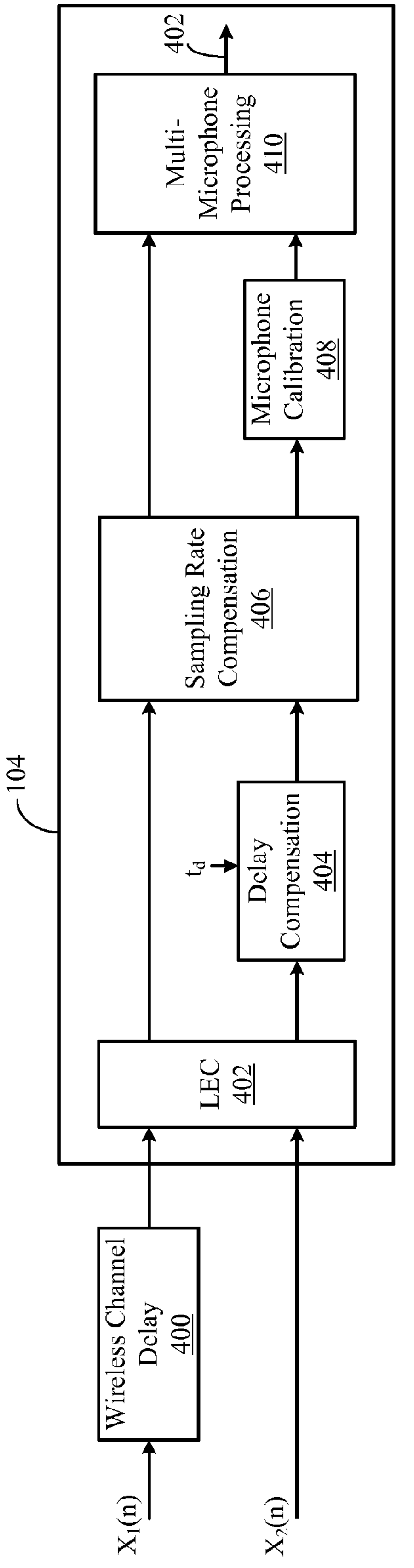
FIG. 4 is a process block diagram of general multi-microphone signal processing with two microphones on different devices.

FIG. 4 is a process block diagram of general multi-microphone signal processing with two microphones on different devices. As shown in the diagram, blocks 402-410 may be performed by the MCD 104.

In the figure, the digitized primary microphone signal samples are denoted by the $x_1(n)$. The digitized secondary microphone signal samples from the MCD 104 are denoted by $x_2(n)$.

Block 400 represents the delay experienced by the primary microphone samples as they are transported over the wireless link 103 from the headset 102 to the MCD 104. The primary microphone sample $x_1(n)$ are delayed relative to the secondary microphone samples $x_2(n)$.

In block 402, linear echo cancellation (LEC) is performed to remove echo from the primary microphone samples. Suitable LEC techniques are known to those of ordinary skill in the art.

In the delay compensation block 404, the secondary microphone signal is delayed by $t_d$ samples before the two microphone signals can be further processed. The delay value $t_d$ required for delay compensation block 404 is typically known for a given wireless protocol, such as a Bluetooth headset. If the delay value is unknown, a nominal value may be used in the delay compensation block 404. The delay value can be further refined, as described below in connection with FIGS. 5-6.

Another hurdle in this application is compensating for the data rate differences between the two microphone signals. This is done in the sampling rate compensation block 406. In general, the headset 102 and the MCD 104 may be controlled by two independent clock sources, and the clock rates can slightly drift with respect to each other over time. If the clock rates are different, the number of samples delivered per frame for the two microphone signals can be different. This is typically known as a sample slipping problem and a variety of approaches that are known to those skilled in the art can be used for handling this problem. In the event of sample slipping, block 406 compensates for the data rate difference between the two microphone signals.

Preferably, the sampling rate of the primary and secondary microphone sample streams is matched before further signal processing involving both streams is performed. There are many suitable ways to accomplish this. For example, one way is to add/remove samples from one stream to match the samples/frame in the other stream. Another way is to do fine sampling rate adjustment of one stream to match the other. For example, let's say both channels have a nominal sampling rate of 8 kHz. However, the actual sampling rate of one channel is 7985 Hz. Therefore, audio samples from this channel need to be up-sampled to 8000 Hz. As another example, one channel may have sampling rate at 8023 Hz. Its audio samples need to be down-sampled to 8 kHz. There are many methods that can be used to do the arbitrary re-sampling of the two streams in order to match their sampling rates.

In block 408, the secondary microphone 108 is calibrated to compensate for differences in the sensitivities of the primary and secondary microphones 106, 108. The calibration is accomplished by adjusting the secondary microphone sample stream.

In general, the primary and secondary microphones 106, 108 may have quite different sensitivities and it is necessary to calibrate the secondary microphone signal so that background noise power received by the secondary microphone 108 has a similar level as that of the primary microphone 106. The calibration can be performed using an approach that involves estimating the noise floor of the two microphone signals, and then using the square-root of the ratio of the two noise floor estimates to scale the secondary microphone signal so that the two microphone signals have same noise floor levels. Other methods of calibrating the sensitivities of the microphones may alternatively be used.

In block 410, the multi-microphone audio processing occurs. The processing includes algorithms that exploit audio signals from multiple microphone to improve voice quality, system performance or the like. Examples of such algorithms include VAD algorithms and source separation algorithms, such as blind source separation (BSS), beamforming, or spatial diversity. The source separation algorithms permit separation of "mixed" sound sources so that only the desired source signal is transmitted to the far-end listener. The foregoing exemplary algorithms are discussed below in greater detail.

Figure 5:
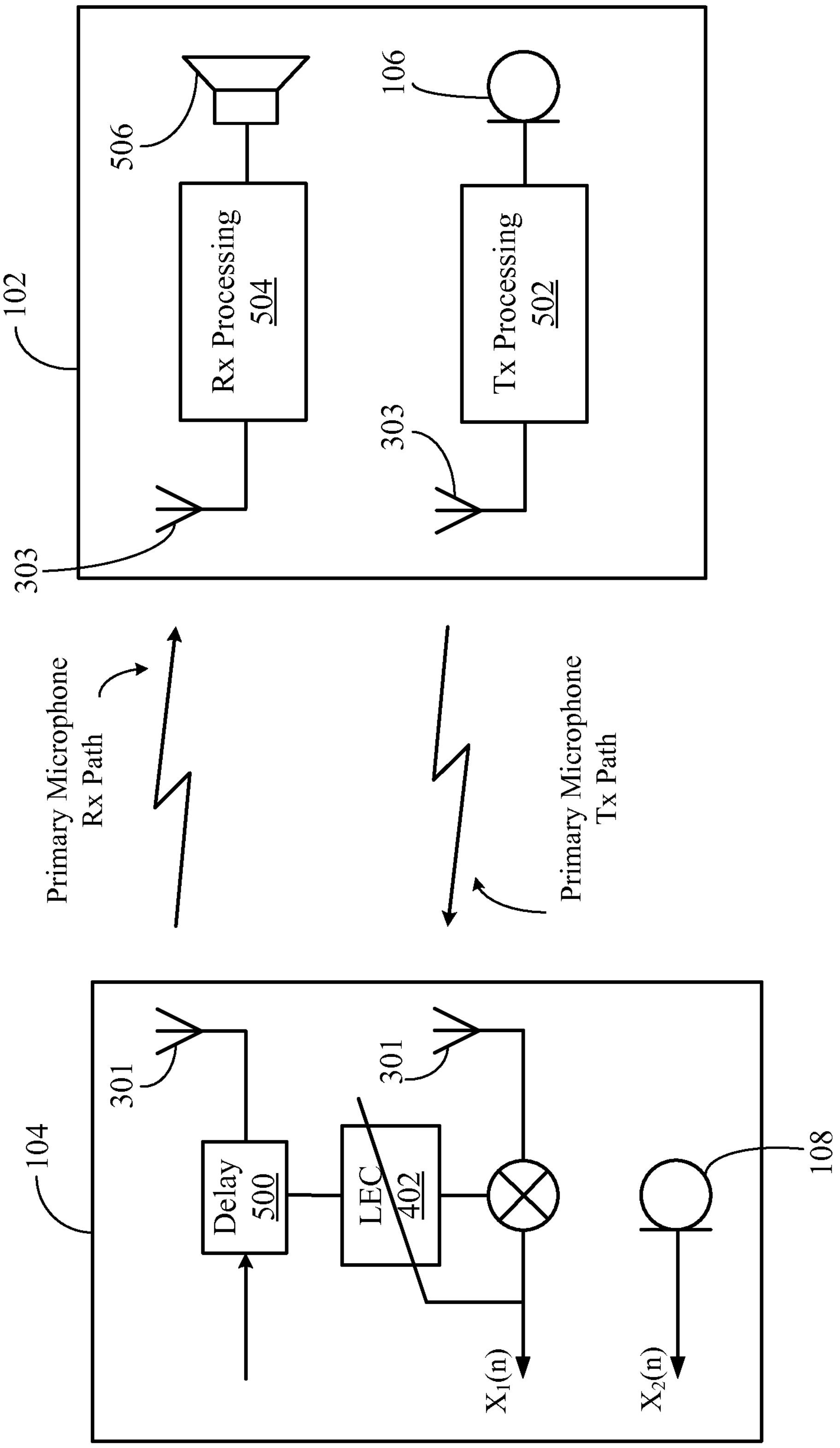
FIG. 5 is a diagram illustrating an exemplary microphone signal delay estimation approach.

FIG. 5 is a diagram illustrating an exemplary microphone signal delay estimation approach that utilizes the linear echo canceller (LEC) 402 included in the MCD 104. The approach estimates the wireless channel delay 500 experienced by primary microphone signals transported over the wireless link 103. Generally, an echo cancellation algorithm is implemented on the MCD 104 to cancel the far-end (Primary Microphone $R_x$ path) echo experience through a headset speaker 506 that is present on the microphone (Primary microphone $T_x$ path) signal. The Primary Microphone $R_x$ path may include $R_x$ processing 504 that occurs in the headset 102, and the Primary microphone $T_x$ path may include $T_x$ processing 502 that occurs in the headset 102.

The echo cancellation algorithm typically consists of the LEC 402 on the front-end, within the MCD 104. The LEC 402 implements an adaptive filter on the far-end $R_x$ signal and filters out the echo from the incoming primary microphone signal. In order to implement the LEC 402 effectively, the round-trip delay from the $R_x$ path to the $T_x$ path needs to be known. Typically, the round-trip delay is a constant or at least close to a constant value and this constant delay is estimated during the initial tuning of the MCD 104 and is used for configuring the LEC solution. Once an estimate of the round-trip delay $t_{rd}$ is known, an initial approximate estimate for the delay, $t_{0d}$, experienced by the primary microphone signal compared to the secondary microphone signal can be computed as half of the round-trip delay. Once the initial approximate delay is known, the actual delay can be estimated by fine searching over a range of values.

The fine search is described as follows. Let the primary microphone signal after LEC 402 be denoted by the $x_1(n)$. Let the secondary microphone signal from the MCD 104 be denoted by $x_2(n)$. The secondary microphone signal is first delayed by $t_{0d}$ to provide the initial approximate delay compensation between the two microphone signals $x_1(n)$ and $x_2(n)$, where n is a sample index integer value. The initial approximate delay is typically a crude estimate. The delayed second microphone signal is then cross-correlated with the primary microphone signal for a range of delay values τ and the actual, refined delay estimate, $t_d$, is found by maximizing the cross-correlation output over a range of τ:

$$t_d = \operatorname{argmax} \sum_n x_1(n) x_2(n - t_{0d} - \tau) \tag{1}$$

The range parameter τ can take both positive and negative integer values. For example, $-10 \le \tau \le 10$. The final estimate $t_d$ corresponds to the τ value that maximizes the cross-correlation. The same cross-correlation approach can also be used for computing the crude delay estimate between the far-end signal and the echo present in the primary microphone signal. However, in this case, the delay values are usually large and the range of values for τ must be carefully chosen based on prior experience or searched over a large range of values.

Figure 6:
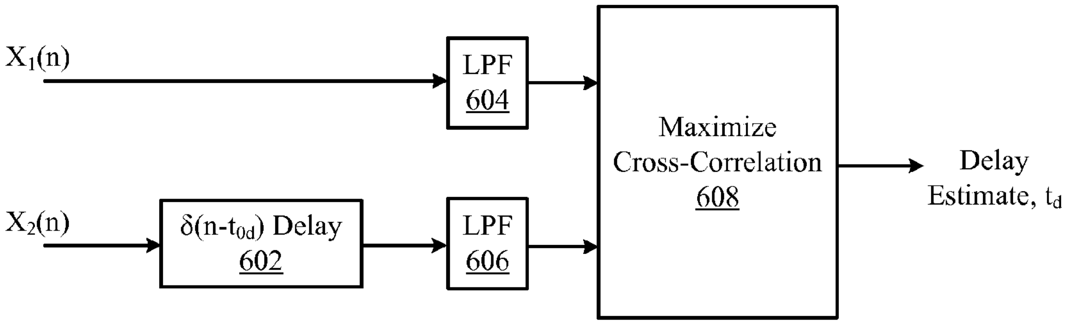
FIG. 6 is a process block diagram of refining a microphone signal delay estimation.

FIG. 6 is a process block diagram illustrating another approach for refining the microphone signal delay estimation. In this approach, the two microphone sample streams are optionally low pass filtered by low pass filters (LPFs) 604, 606 before computing the cross-correlation for delay estimation using Equation 1 above (block 608). The low pass filtering is helpful because when the two microphones 106, 108 are placed far-apart, only the low frequency components are correlated between the two microphone signals. The cut-off frequencies for the low pass filter can be found based on the methods outlined herein below describing VAD and BSS. As shown block 602 of FIG. 6, the secondary microphone samples are delayed by the initial approximate delay, $t_{0d}$, prior to low pass filtering.

Figure 7:
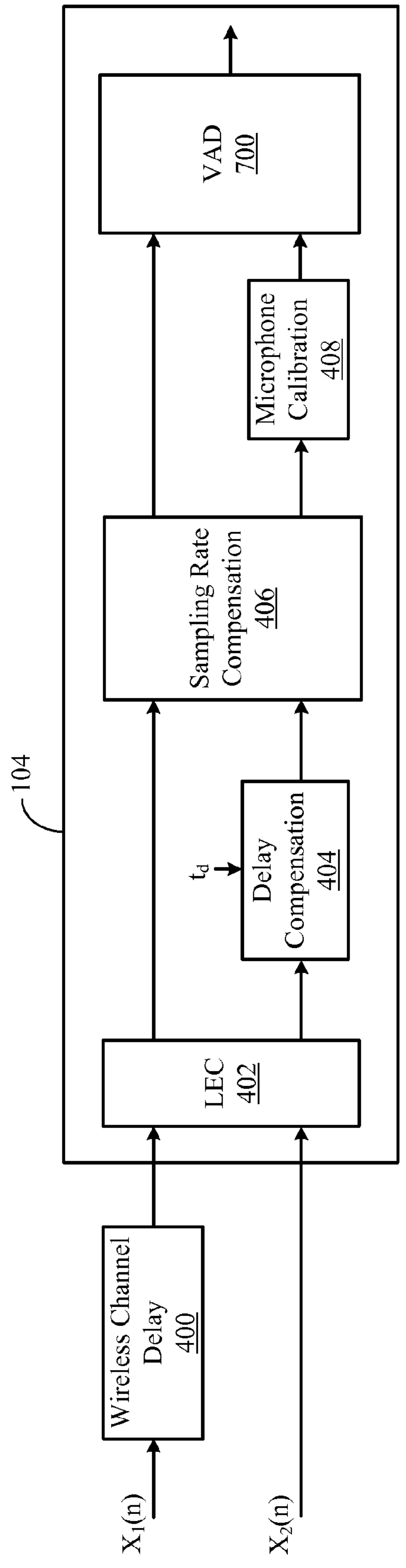
FIG. 7 is a process block diagram of voice activity detection (VAD) using two microphones on different devices.

FIG. 7 is a process block diagram of voice activity detection (VAD) 700 using two microphones on different devices. In a single microphone system, the background noise power cannot be estimated well if the noise is non-stationary across time. However, using the secondary microphone signal (the one from the MCD 104), a more accurate estimate of the background noise power can be obtained and a significantly improved voice activity detector can be realized. The VAD 700 can be implemented in a variety of ways. An example of VAD implementation is described as follows.

In general, the secondary microphone 108 will be relatively far (greater than 8 cm) from the primary microphone 106, and hence the secondary microphone 108 will capture mostly the ambient noise and very little desired speech from the user. In this case, the VAD 700 can be realized simply by comparing the power level of the calibrated secondary microphone signal and the primary microphone signal. If the power level of the primary microphone signal is much higher than that of the calibrated secondary microphone signal, then it is declared that voice is detected. The secondary microphone 108 may be initially calibrated during manufacture of the MCD 104 so that the ambient noise level captured by the two microphones 106, 108 is close to each other. After calibration, the average power of each block (or frame) of received samples of the two microphone signals is compared and speech detection is declared when the average block power of the primary microphone signal exceeds that of the secondary microphone signal by a predetermined threshold. If the two microphones are placed relatively far-apart, correlation between the two microphone signals drops for higher frequencies. The relationship between separation of microphones (d) and maximum correlation frequency ($f_{max}$) can be expressed using the following equation:

$$f_{max} = \frac{c}{2d} \tag{2}$$

Where, c=343 m/s is the speed of sound in air, d is the microphone separation distance and $f_{max}$ is the maximum correlation frequency. The VAD performance can be improved by inserting a low pass filter in the path of two microphone signals before computing the block energy estimates. The low pass filter selects only those higher audio frequencies that are correlated between the two microphone signals, and hence the decision will not be biased by uncorrelated components. The cut-off of the low pass filter can be set as below.

$$f\text{-cutoff}=\max(f\text{max},800);$$

$$f\text{-cutoff}=\min(f\text{-cutoff},2800). \tag{3}$$

Here, 800 Hz and 2800 Hz are given as examples of minimum and maximum cut-off frequencies for the low pass filter. The low pass filter may be a simple FIR filter or a biQuad IIR filter with the specified cut-off frequency.

Figure 8:
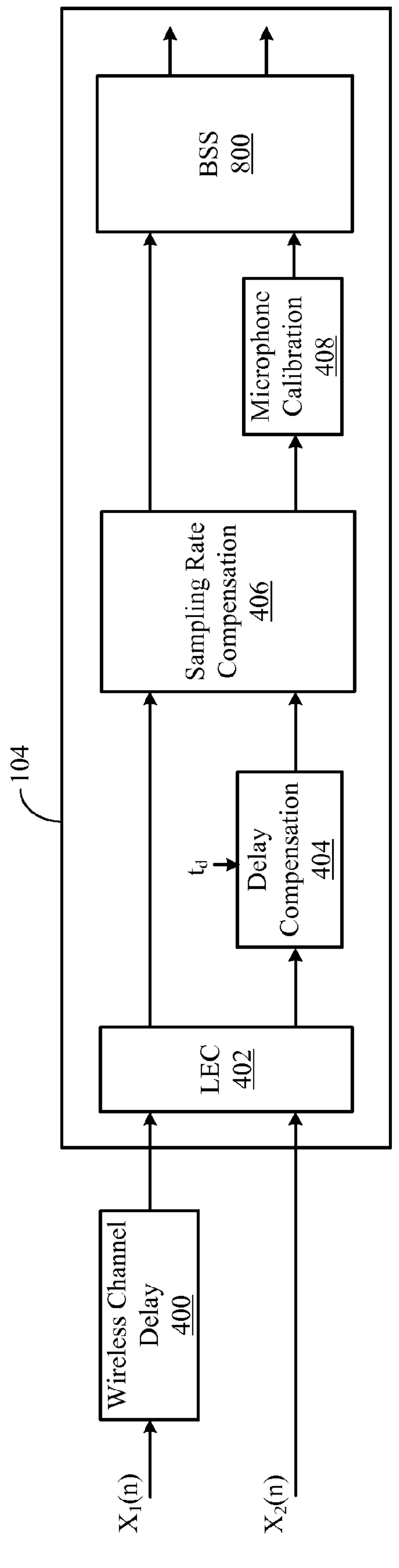
FIG. 8 is a process block diagram of BSS using two microphones on different devices.

FIG. 8 is a process block diagram of blind source separation (BSS) using two microphones on different devices. A BSS module 800 separates and restores source signals from multiple mixtures of source signals recorded by an array of sensors. The BSS module 800 typically employs higher order statistics to separate the original sources from the mixtures.

The intelligibility of the speech signal captured by the headset 102 can suffer greatly if the background noise is too high or too non-stationary. The BSS 800 can provide significant improvement in the speech quality in these scenarios.

The BSS module 800 may use a variety of source separation approaches. BSS methods typically employ adaptive filters to remove noise from the primary microphone signal and remove desired speech from the secondary microphone signal. Since an adaptive filter can only model and remove correlated signals, it will be particularly effective in removing low frequency noise from the primary microphone signal and low frequency speech from the secondary microphone signal. The performance of the BSS filters can be improved by adaptive filtering only in the low frequency regions. This can be achieved in two ways.

Figure 9:
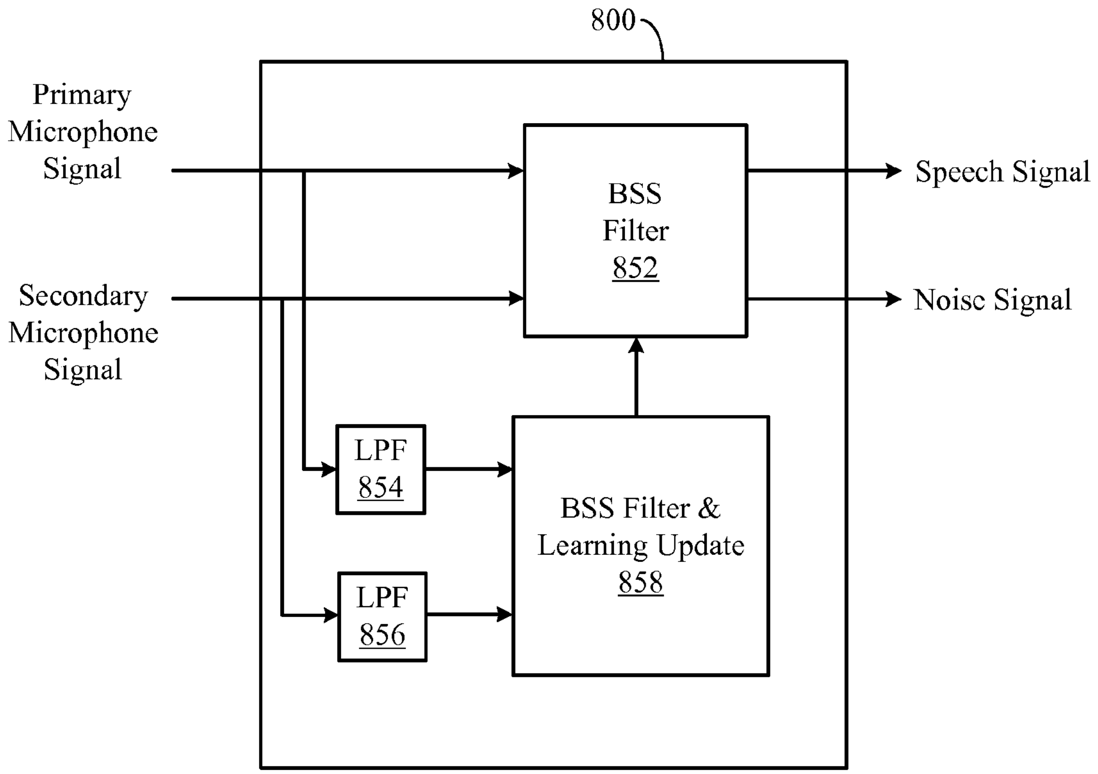
FIG. 9 is a process block diagram of modified BSS implementation with two microphone signals.

FIG. 9 is a process block diagram of modified BSS implementation with two microphone signals. The BSS implementation includes a BSS filter 852, two low pass filters (LPFs) 854,856, and a BSS filter learning and update module 858. In a BSS implementation, the two input audio signals are filtered using adaptive/fixed filters 852 to separate the signals coming from different audio sources. The filters 852 used may be adaptive, i.e., the filter weights are adapted across time as a function of the input data, or the filters may be fixed, i.e., a fixed set of pre-computed filter coefficients are used to separate the input signals. Usually, adaptive filter implementation is more common as it provides better performance, especially if the input statistics are non-stationary.

Typically for two microphone devices, BSS employs two filters—one filter to separate out the desired audio signal from the input mixture signals and another filter to separate out the ambient noise/interfering signal from the input mixture signals. The two filters may be FIR filters or IIR filters and in case of adaptive filters, the weights of the two filters may be updated jointly. Implementation of adaptive filters involves two stages: first stage computes the filter weight updates by learning from the input data and the second stage implements the filter by convolving the filter weight with the input data. Here, it is proposed that low pass filters 854 be applied to the input data for implementing the first stage 858—computing filter updates using the data, however, for the second stage 852—the adaptive filters are implemented on the original input data (without LPF). The LPFs 854, 856 may be designed as IIR or FIR filters with cut-off frequencies as specified in Equation (3). For time-domain BSS implementation, the two LPFs 854,856 are applied to the two microphone signals, respectively, as shown in FIG. 9. The filtered microphone signals are then provided to the BSS filter learning and update module 858. In response to the filtered signals, the module 858 updates the filter parameters of BSS filter 852.

Figure 10:
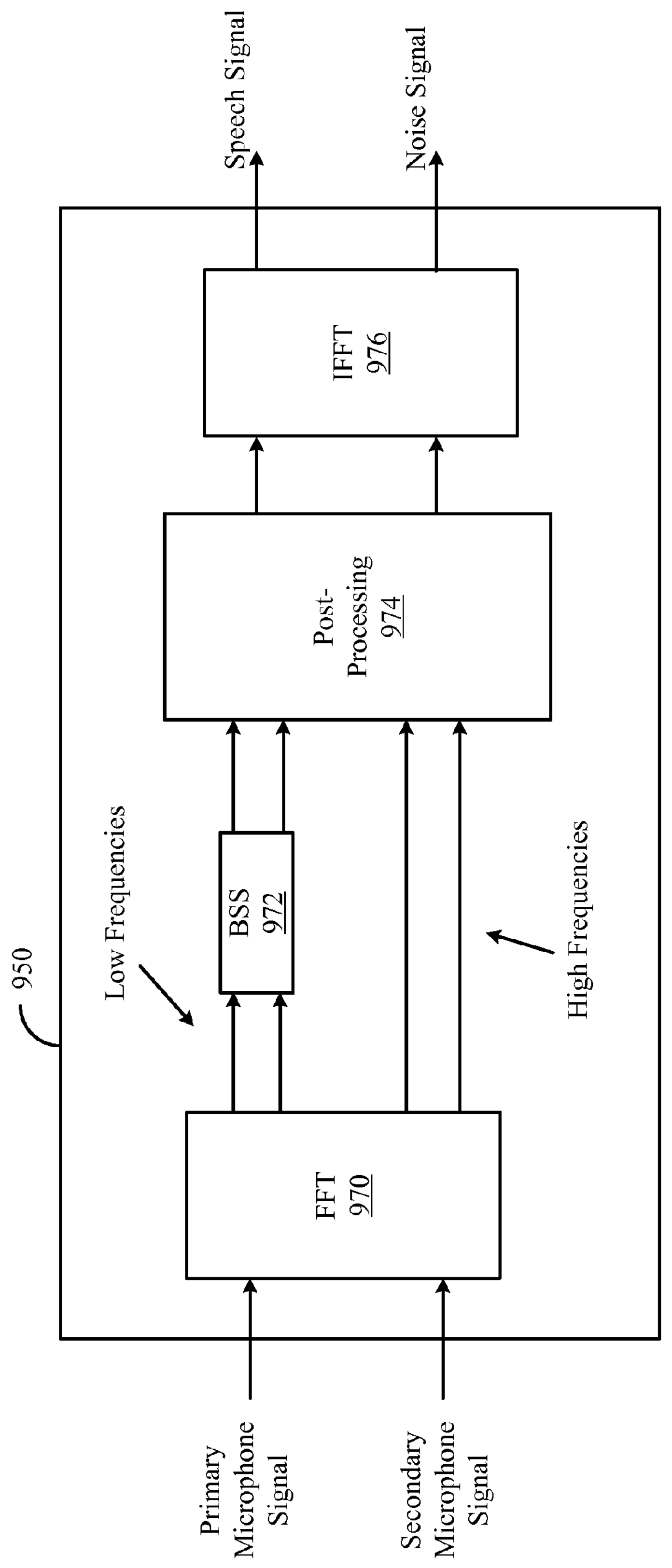
FIG. 10 is a process block diagram of modified frequency domain BSS implementation.

A block diagram of the frequency domain implementation of BSS is shown in FIG. 10. This implementation includes a fast Fourier transform (FFT) block 970, a BSS filter block 972, a post-processing block 974, and an inverse fast Fourier transform (IFFT) block 976. For frequency domain BSS implementation, the BSS filters 972 are implemented only in the low frequencies (or sub-bands). The cut-off for the range of low frequencies may be found in the same way as given in Equations (2) and (3). In the frequency domain implementation, a separate set of BSS filters 972 are implemented for each frequency bin (or subband). Here again, two adaptive filters are implemented for each frequency bin—one filter to separate the desired audio source from the mixed inputs and another to filter out the ambient noise signal from the mixed inputs. A variety of frequency domain BSS algorithms may be used for this implementation. Since the BSS filters already operate on narrowband data, there is no need to separate the filter learning stage and implementation stage in this implementation. For the frequency bins corresponding to low frequencies (e.g., <800 Hz), the frequency domain BSS filters 972 are implemented to separate the desired source signal from other source signals.

Usually, post-processing algorithms 974 are also used in conjunction with BSS/beamforming methods in order to achieve higher levels of noise suppression. The post-processing approaches 974 typically use Wiener filtering, spectral subtraction or other non-linear techniques to further suppress ambient noise and other undesired signals from the desired source signal. The post-processing algorithms 974 typically do not exploit the phase relationship between the microphone signals, hence they can exploit information from both low and high-frequency portions of the secondary microphone signal to improve the speech quality of the transmitted signal. It is proposed that both the low-frequency BSS outputs and the high-frequency signals from the microphones are used by the post-processing algorithms 974. The post-processing algorithms compute an estimate of noise power level for each frequency bin from the BSS's secondary microphone output signal (for low frequencies) and secondary microphone signal (for high-frequencies) and then derive a gain for each frequency bin and apply the gain to the primary transmitted signal to further remove ambient noise and enhance its voice quality.

To illustrate the advantage of doing noise suppression only in low frequencies, consider the following exemplary scenario. The user may be using a wireless or wired headset while driving in a car and keep the mobile handset in his/her shirt/jacket pocket or somewhere that is not more than 20 cm away from the headset. In this case, frequency components less than 860 Hz will be correlated between the microphone signals captured by the headset and the handset device. Since the road noise and engine noise in a car predominantly contain low frequency energy mostly concentrated under 800 Hz, the low frequency noise suppression approaches can provide significant performance improvement.

Figure 11:
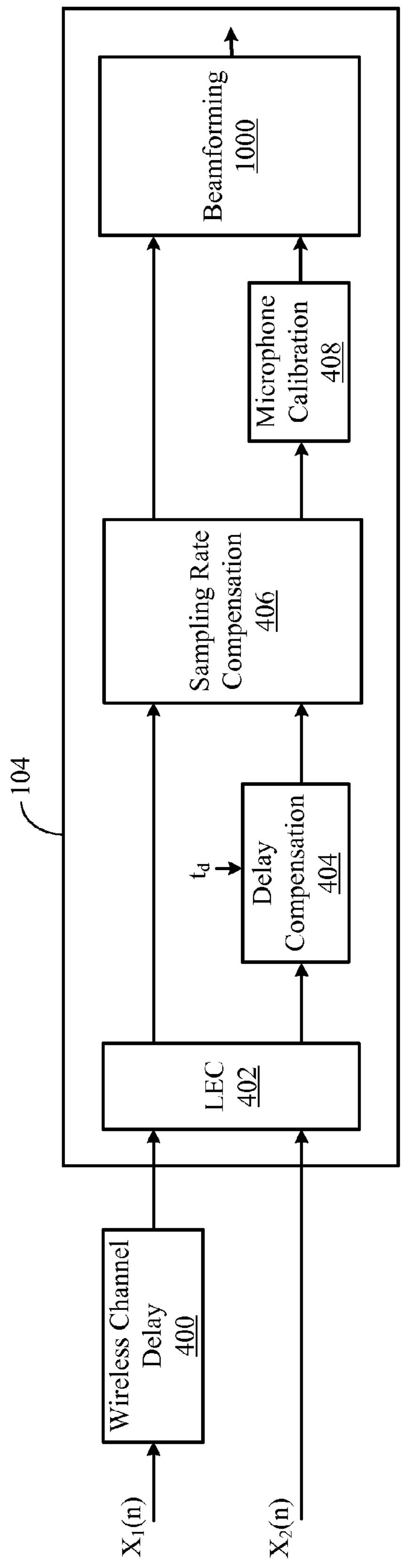
FIG. 11 is a process block diagram of a beamforming method using two microphones on different devices.

FIG. 11 is a process block diagram of a beamforming method 1000 using two microphones on different devices. Beamforming methods perform spatial filtering by linearly combining the signals recorded by an array of sensors. In the context of this disclosure, the sensors are microphone placed on different devices. Spatial filtering enhances the reception of signals from the desired direction while suppressing the interfering signals coming from other directions.

The transmitted voice quality can also be improved by performing beamforming using the two microphones 106, 108 in the headset 102 and MCD 104. Beamforming improves the voice quality by suppressing ambient noise coming from directions other than that of the desired speech source. The beamforming method may use a variety of approaches that are readily known to those of ordinary skill in the art.

Beamforming is typically employed using adaptive FIR filters and the same concept of low pass filtering the two microphone signals can be used for improving the learning efficiency of the adaptive filters. A combination of BSS and beamforming methods can also be employed to do multi-microphone processing.

Figure 12:
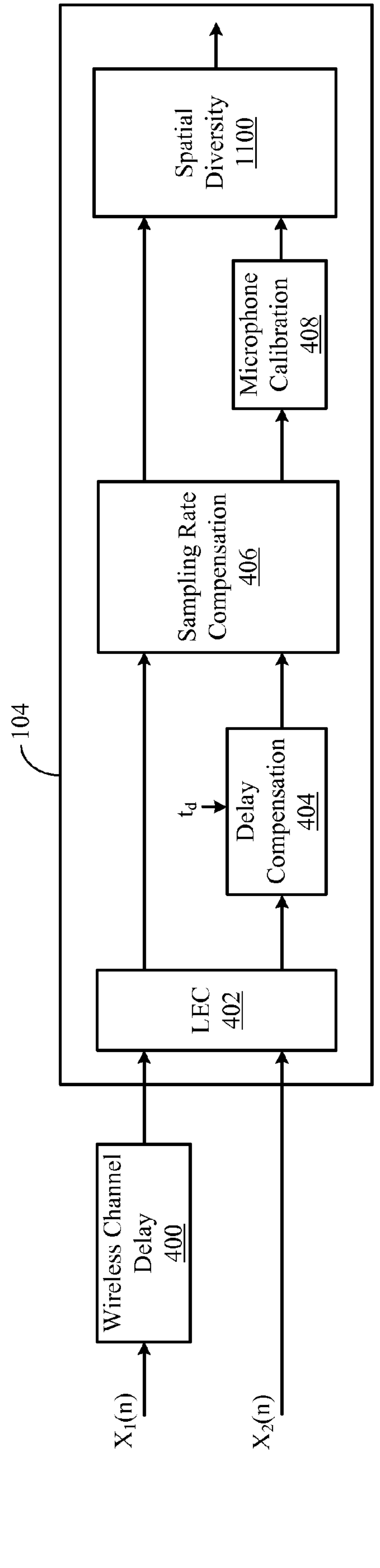
FIG. 12 is a process block diagram of a spatial diversity reception technique using two microphones on different devices.

FIG. 12 is a process block diagram of a spatial diversity reception technique 1100 using two microphones on different devices. Spatial diversity techniques provide various methods for improving the reliability of reception of acoustic signals that may undergo interference fading due to multipath propagation in the environment. Spatial diversity schemes are quite different from beamforming methods in that beamformers work by coherently combining the microphone signals in order to improve the signal to noise ratio (SNR) of the output signal where as diversity schemes work by combining multiple received signals coherently or incoherently in order to improve the reception of a signal that is affected by multipath propagation. Various diversity combining techniques exist that can be used for improving the quality of the recorded speech signal.

One diversity combining technique is the selection combining technique which involves monitoring the two microphone signals and picking the strongest signal, i.e., the signal with highest SNR. Here the SNR of the delayed primary microphone signal and the calibrated secondary microphone signal are computed first and then the signal with the strongest SNR is selected as the output. The SNR of the microphone signals can be estimated by following techniques known to those of ordinary skill in the art.

Another diversity combining technique is the maximal ratio combining technique, which involves weighting the two microphone signals with their respective SNRs and then combining them to improve the quality of the output signal. For example, the weighted combination of the two microphone signal can be expressed as follows:

$$y(n)=a_1(n)s_1(n)+a_2(n)s_2(n-\tau) \quad (4)$$

Here, $s_1(n)$ and $s_2(n)$ are the two microphone signals and $a_1(n)$ and $a_2(n)$ are the two weights, and y(n) is the output. The second microphone signal may be optionally delayed by a value $\tau$ in order to minimize muffling due to phase cancellation effects caused by coherent summation of the two microphone signals.

The two weights must be less than unity and at any given instant, and the sum of two weights must add to unity. The weights may vary over time. The weights may be configured as proportional to the SNR of the corresponding microphone signals. The weights may be smoothed over time and changed very slowly with time so that the combined signal y(n) does not have any undesirable artifacts. In general, the weight for the primary microphone signal is very high, as it captures the desired speech with a higher SNR than the SNR of the secondary microphone signal.

Alternatively, energy estimates calculated from the secondary microphone signal may also be used in non-linear post-processing module employed by noise suppression techniques. Noise suppression techniques typically employ non-linear post-processing methods such as spectral subtraction to remove more noise from the primary microphone signal. Post-processing techniques typically require an estimate of ambient noise level energy in order to suppress noise in the primary microphone signal. The ambient noise level energy may be computed from the block power estimates of the secondary microphone signal or as weighted combination of block power estimates from both microphone signals.

Some of the accessories such as Bluetooth headsets are capable of offering range information through the Bluetooth communication protocol. Thus, in Bluetooth implementations, the range information gives how far the headset 102 is located from the MCD 104. If the range information is not available, an approximate estimate for the range may be calculated from the time-delay estimate computed using equation (1). This range information can be exploited by the MCD 104 for deciding what type of multi-microphone audio processing algorithm to use for improving the transmitted voice quality. For example, the beamforming methods ideally work well when the primary and secondary microphones are located closer to each other (distance<8 cm). Thus, in these circumstances, beamforming methods can be selected. The BSS algorithms work well in the mid-range (6 cm<distance<15 cm) and the spatial diversity approaches work well when the microphones are spaced far apart (distance>15 cm). Thus, in each of these ranges, the BSS algorithms and spatial diversity algorithms can be selected by the MCD 104, respectively. Thus, knowledge of the distance between the two microphones can be utilized for improving the transmitted voice quality.

The functionality of the systems, devices, headsets and their respective components, as well as the method steps and blocks described herein may be implemented in hardware, software, firmware, or any suitable combination thereof. The software/firmware may be a program having sets of instructions (e.g., code segments) executable by one or more digital circuits, such as microprocessors, DSPs, embedded controllers, or intellectual property (IP) cores. If implemented in software/firmware, the functions may be stored as instructions or code on one or more computer-readable media. Computer-readable medium includes computer storage medium, including any non-transitory medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Certain embodiments have been described. However, various modifications to these embodiments are possible, and the principles presented herein may be applied to other embodiments as well. For example, the principles disclosed herein may be applied to other devices, such as wireless devices including personal digital assistants (PDAs), personal computers, stereo systems, video games and the like. Also, the principles disclosed herein may be applied to wired headsets, where the communications link between the headset and another device is a wire, rather than a wireless link. In addition, the various components and/or method steps/blocks may be implemented in arrangements other than those specifically disclosed without departing from the scope of the claims.

Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A method of processing audio signals comprising:

capturing a first audio signal, representing sound from a plurality of sound sources, with a first microphone located on a first device that includes a first communication interface configured to exchange wireless signals with a second device over a communication link;

receiving a second audio signal from a second microphone located on the second device selecting a source separating algorithm from a plurality of source separating algorithms, the selection being based on range information indicating a distance between the first microphone and the second microphone; and processing the first and second captured audio signals according to the selected source separating algorithm to produce a signal representing sound from one of the sound sources separated from sound from others of the sound sources.

2. The method of claim 1, wherein the second device is a wireless headset in communication with the first device over the communication link.

3. The method of claim 2, wherein the communication link is a wireless link that uses a Bluetooth protocol.

4. The method of claim 3, wherein the range information is provided by the Bluetooth protocol.

5. The method of claim 1, wherein processing includes selecting the sound source separating algorithm from a blind source separation algorithm, beamforming algorithm or spatial diversity algorithm, wherein range information is used by the selected source separating algorithm.

6. The method of claim 1, further comprising:

performing voice activity detection based on the signal.

7. The method of claim 1, further comprising:

cross-correlating the first and second audio signals; and estimating a delay between the first and second audio signals based on the cross-correlation between the first and second audio signals.

8. The method of claim 7, further comprising low pass filtering the first and second audio signals prior to performing the cross-correlation of the first and second audio signals.

9. The method of claim 1, further comprising:

compensating for a delay between the first and second audio signals.

10. The method of claim 1, further comprising:

compensating for different audio sampling rates of the first and second audio signals.

11. An apparatus, comprising:

a first microphone, a first communication interface configured to exchange wireless signals with a separate device; and one or more processors configured to:

receive a second audio signal, representing sound from the sound sources, from a second microphone located on the separate device, select a source separating algorithm from a plurality of source separating algorithms, the selection being based on range information indicating a distance between the first microphone and the second microphone, and process the first and second audio signals according to the selected source separating algorithm to produce a signal representing sound from one of the sound sources separated from sound from others of the sources.

12. The apparatus of claim 11, wherein the separate device is a wireless headset.

13. The apparatus of claim 12, wherein the communication link is a wireless link that uses a Bluetooth protocol.

14. The apparatus of claim 13, wherein the range information is provided by the Bluetooth protocol.

15. The apparatus of claim 11, wherein the processor selects the sound source separating algorithm from a blind source separation algorithm, beamforming algorithm or spatial diversity algorithm.

16. The apparatus of claim 11, further comprising:

a voice activity detector responsive to the signal.

17. An apparatus, comprising:

means for capturing a first audio signal means for exchanging wireless signals with a separate device;

means for receiving a second audio signal, representing sound from the sound sources, from the second device means for selecting a source separating algorithm from a plurality of source separating algorithms, the selection being based on range information indicating a distance between the first microphone and the second microphone; and means for processing the first and second captured audio signals according to the selected source separating algorithm to produce a signal representing sound from one of the sound sources separated from sound from others of the sound sources.

18. The apparatus of claim 17, wherein the separate device is a wireless headset communicating with the apparatus by way of the means for exchanging.

19. The apparatus of claim 18, wherein the means for exchanging uses a Bluetooth protocol.

20. The apparatus of claim 19, wherein the range information is provided by the Bluetooth protocol.

21. The apparatus of claim 17, further comprising:

means for selecting the sound source separating algorithm from a blind source separation algorithm, beamforming algorithm or spatial diversity algorithm.

22. A non-transitory computer-readable medium embodying a set of instructions executable by one or more processors, comprising:

code for capturing a first audio signal, representing sound from a plurality of sound sources, at a first device that includes a first communication interface configured to exchange wireless signals with a separate device;

code for receiving a second audio signal from the second device;

code for selecting a source separating algorithm from a plurality of source separating algorithms, the selection being based on range information indicating a distance between the first microphone and the second microphone; and code for processing the first and second captured audio signals according to the selected source separating algorithm to produce a signal representing sound from one of the sound sources separated from sound from others of the sound sources.

23. The computer-readable medium of claim 22, further comprising:

code for performing voice activity detection based on the signal.

24. The computer-readable medium of claim 22, further comprising:

code for cross-correlating the first and second audio signals; and code for estimating a delay between the first and second audio signals based on the cross-correlation between the first and second audio signals.

25. The computer-readable medium of claim 24, further comprising code for low pass filtering the first and second audio signals prior to prior to performing the cross-correlation of the first and second audio signals.

26. The computer-readable medium of claim 22, further comprising:

code for compensating for a delay between the first and second audio signals.

27. The computer-readable medium of claim 22, further comprising:

code for compensating for different audio sampling rates of the first and second audio signals.

28. The method of claim 1, wherein the first device is a wireless device.

29. The apparatus of claim 11, wherein the apparatus is a wireless device.

30. The apparatus of claim 17, wherein the apparatus is a wireless device.

31. The computer-readable medium of claim 24, wherein the first device is a wireless device.

* * * * *